United States Patent [19]

Heppe et al.

[11] Patent Number: 5,457,373
[45] Date of Patent: Oct. 10, 1995

[54] ELECTRIC MOTOR WITH INTEGRALLY PACKAGED DAY/NIGHT CONTROLLER

[75] Inventors: Richard A. Heppe; George W. Horner, both of St. Louis, Mo.

[73] Assignee: MagneTek Century Electric, Inc., St. Louis, Mo.

[21] Appl. No.: 126,338

[22] Filed: Sep. 24, 1993

[51] Int. Cl.⁶ ........................................ H02P 1/26
[52] U.S. Cl. ........................ 318/772; 388/800; 388/909; 388/933; 388/934
[58] Field of Search ............................ 318/772; 388/800, 388/909, 933, 934

[56] References Cited

U.S. PATENT DOCUMENTS

| | | | |
|---|---|---|---|
| 4,152,630 | 5/1979 | Wanlass | 318/772 |
| 4,348,626 | 9/1982 | London | 318/772 |
| 4,450,391 | 5/1984 | Hara | 318/772 |
| 4,507,110 | 3/1985 | Boeckel | 318/772 |
| 5,049,801 | 9/1991 | Potter | 318/772 |
| 5,134,332 | 7/1992 | Nakamura et al. | 318/772 |

Primary Examiner—William M. Shoop, Jr.
Assistant Examiner—Karen Masih
Attorney, Agent, or Firm—Seldon & Scillieri

[57] ABSTRACT

An AC motor is provided with a motor housing and a photoelectric sensor associated with the housing. The sensor is part of a motor control circuit which is thereby responsive to the ambient light condition to control the motor by selectively switching At on and off, or alternatively by selectively switching between higher and lower speeds. The control circuit derives its power from the motor's AC input terminals, thereby yielding a self-contained motor control unit, which requires no timer unit and no wiring or mounting by the user. In accordance with another aspect of the present invention, the photoelectric sensor extends through an aperture in a motor housing end cap with the associated control circuitry fitable within the end cap, thereby providing a retrofit for existing motors.

15 Claims, 4 Drawing Sheets

5,457,373

ELECTRIC MOTOR WITH INTEGRALLY PACKAGED DAY/NIGHT CONTROLLER

BACKGROUND OF THE INVENTION

This invention relates to electric motors, and more specifically to the control of electric motors.

Electric motors are used for numerous applications wherein daytime and nighttime operations differ. For example, fractional horsepower AC electric motors used as swimming pool pump motors are operated at a high speed during the day, when swimming pool usage and sunlight's effect on algae formation demand maximum circulation and filtration; at night, the motors are typically shut off or run at lower speed because the pool is unused or used minimally, and algae growth is minimal due to the absence of sunlight. Two-speed pump motors, for example, typically run at half speed at night to provide additional filtration at approximately one-fifth the electrical consumption.

Conventionally, manually set timers have been utilized to automatically turn such pump motors on at a pre-set time early in the day, and to disable or slow the motor at a pre-set time at the end of the day. Those skilled in the art, however, recognize that the timer mechanism is separately mounted to a wall or fixture, and that it must be wired to the motor. That additional mounting and wiring typically requires installation by a skilled person, and adds to the cost. Moreover, seasonal changes in the hours of daylight require the timer to be periodically reset by the user.

SUMMARY OF THE INVENTION

In accordance with the invention, an AC motor is provided with a motor housing and a photoelectric sensor associated with the housing. The sensor is part of a motor control circuit which is thereby responsive to the ambient light condition to control the motor by selectively switching it on and off, or alternatively by selectively switching between higher and lower speeds. The control circuit derives its power from the motor's AC input terminals, thereby yielding a self-contained motor control unit (i.e., contained within the motor housing) which requires no timer unit, and no wiring or mounting by the user.

In accordance with another aspect of the invention, a self-contained day/night retrofit motor control unit is provided comprising a motor housing (or housing end cap) with interior and exterior faces, a photoelectric sensor for sensing the ambient light condition at at least a portion of the exterior face, and associated control circuitry fitable within the housing (or end cap) so as not to interfere with the motor's operation, for selectively switching the motor between first and second speeds in response to the sensed ambient light condition. The retrofit unit thereby modifies a motor so that it is capable of automatically switching between day and night operation without a timer or external wiring or switches.

When switching between first and second speeds is described herein, it should be understood that for a single speed motor, which is simply "on" or "off", the motor's operating speed can conveniently be considered one of the speeds, and the "off" condition of zero speed can conveniently be considered the other speed.

DESCRIPTION OF THE PREFERRED EMBODIMENT

Figure 1:
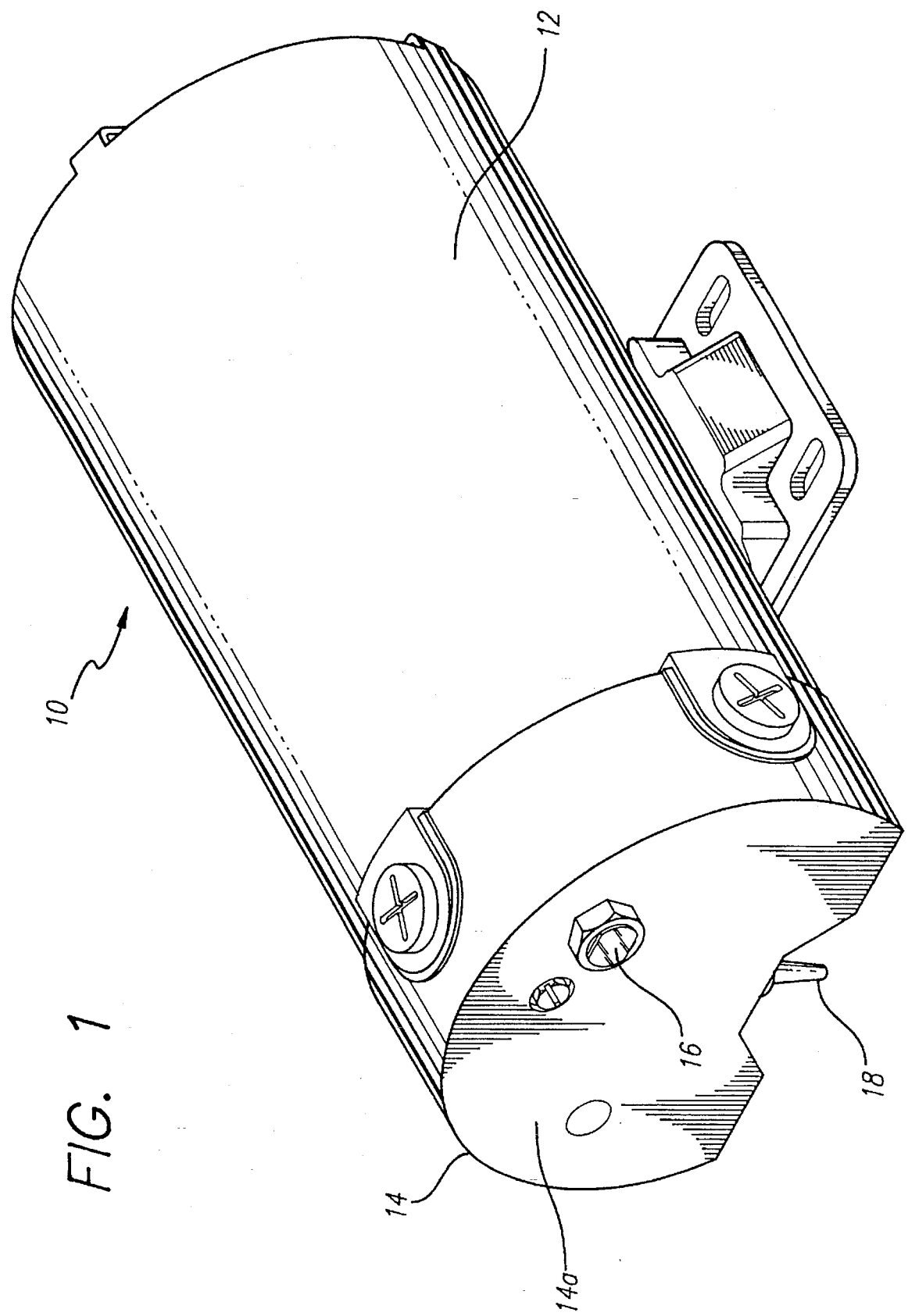
FIG. 1 is a perspective view of a fractional horsepower AC motor constructed in accordance with the invention.
Figure 2:
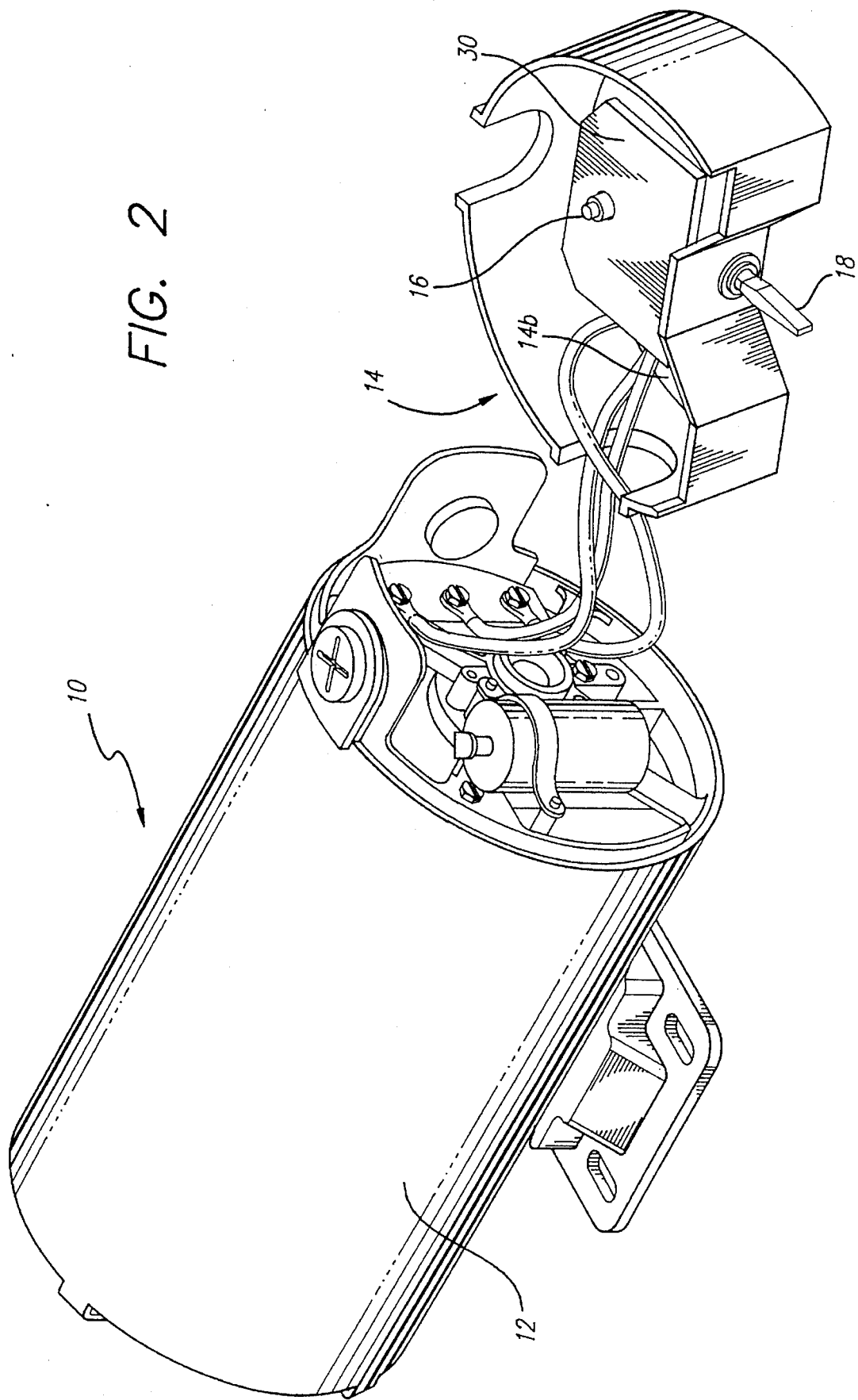
FIG. 2 is a perspective view of the motor of FIG. 1, with its end cap removed.

FIG. 1 is a perspective view of a fractional horsepower AC motor constructed in accordance with the invention. The motor 10 is shown to comprise a housing 12 having an end cap 14. The end cap has an exterior face 14a and an interior face 14b (FIG. 2). A photoelectric sensor 16 extends through an aperture in the end cap so as to sense the ambient light condition at the end cap's exterior. The sensor 16 is sealed within the end cap in any manner known in the art to prevent moisture and dust from reaching the interior of the motor housing through the aperture. A toggle switch 18 also extends from the end cap. As will become clearer below, the toggle switch is provided to enable the motor's user to select between automatic (i.e., photoelectrically controlled) operation and manual operation.

As those skilled it the art recognize, a change occurs in the electrical characteristics of the sensor 16 when it is impinged upon by light. Typically, the characteristic which changes is the sensor's electrical resistance, which is detected as either a change of the voltage across the sensor or the current through it. In accordance with the invention, the variation in voltage is detected by a switching circuit, and utilized to control the motor speed.

Figure 3:
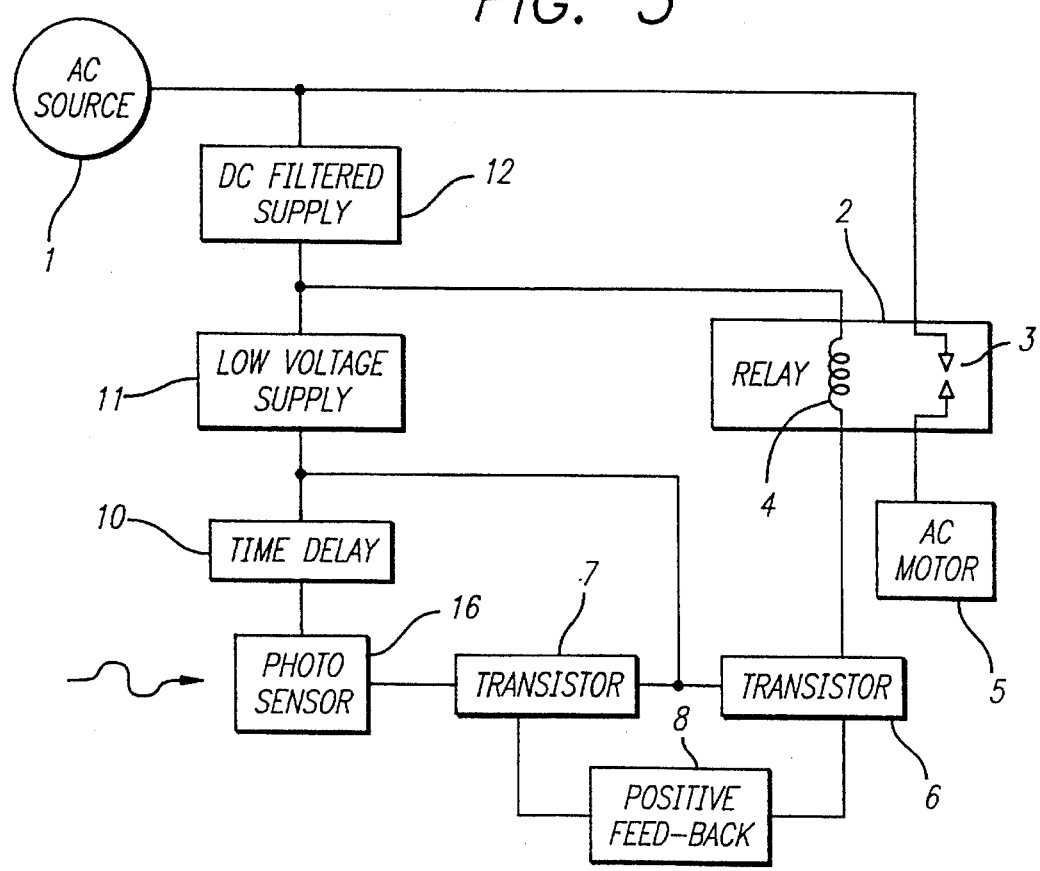
FIG. 3 is a block diagram schematic of a motor with day/night controller constructed in accordance with the invention.

FIG. 3 is a block diagram representation of a motor and controller circuit constructed in accordance with the invention. The field winding of an AC motor 5 is placed in series with an AC power source 1 through normally open contacts 3 of a relay 2. When the relay contacts 3 close, the motor is energized; accordingly the motor is controlled by the open/closed state of the contacts.

The contacts 3, in turn, are closed by energizing the relay coil 4. The coil 4 is selectively energized by a switching circuit, described in greater detail below, but represented in FIG. 3 by transistor circuits 6,7,8 which are responsive to the detection of light by photosensor 16 to energize the relay coil.

Naturally, the motor control circuitry can be modified to provide for activation of the motor at night, rather than during the day. For example, a relay having normally closed contacts can be used, so that the contacts open when the relay coil is energized, rather than close as in the illustrated embodiment. Alternatively, normally open relay contacts can be used as illustrated in FIG. 3, but with the switching circuitry components and/or photosensor arranged to energize the relay coil at night, rather than during the day, to thereby close the normally open relay contacts and energize the motor.

The relay coil 4, photosensor 16 and switching circuit 6,7,8 require respective levels of DC voltage. Accordingly, the relay coil 4 is coupled to a source 12 of rectified and filtered DC voltage comprising a rectifier and filter capacitor coupled to the AC source 1. The DC source 12 is powered by the AC source 1; more specifically, it is connected to the AC source at the AC power terminals within the motor housing. A further reduced and regulated DC voltage for the photosensor 16 and transistor circuits 6,7,8 is provided by lower D.C. voltage source 11, which derives its power from the DC source 12.

The photoelectric sensor 16 is coupled to the low voltage supply 11 through a time delay circuit 10. The purpose of the time delay circuit is twofold. First, it sets the light level at which switching will occur; i.e., the set point. Second, it delays the photosensor's effect on the switching circuit until the sensed change in ambient light condition has passed the set point for a predetermined time, thereby minimizing "nuisance switching" due to momentary changes in light level. Naturally, one or both functions of the delay circuit can be made user adjustable for optimum on-site adjustment.

The transistor circuits 6,7 of the switching circuit are interconnected through a positive feedback circuit 8 to maximize switching performance, and assure that either substantially full voltage is applied to the relay coil 4, or substantially no voltage is applied to the relay coil.

Figure 4:
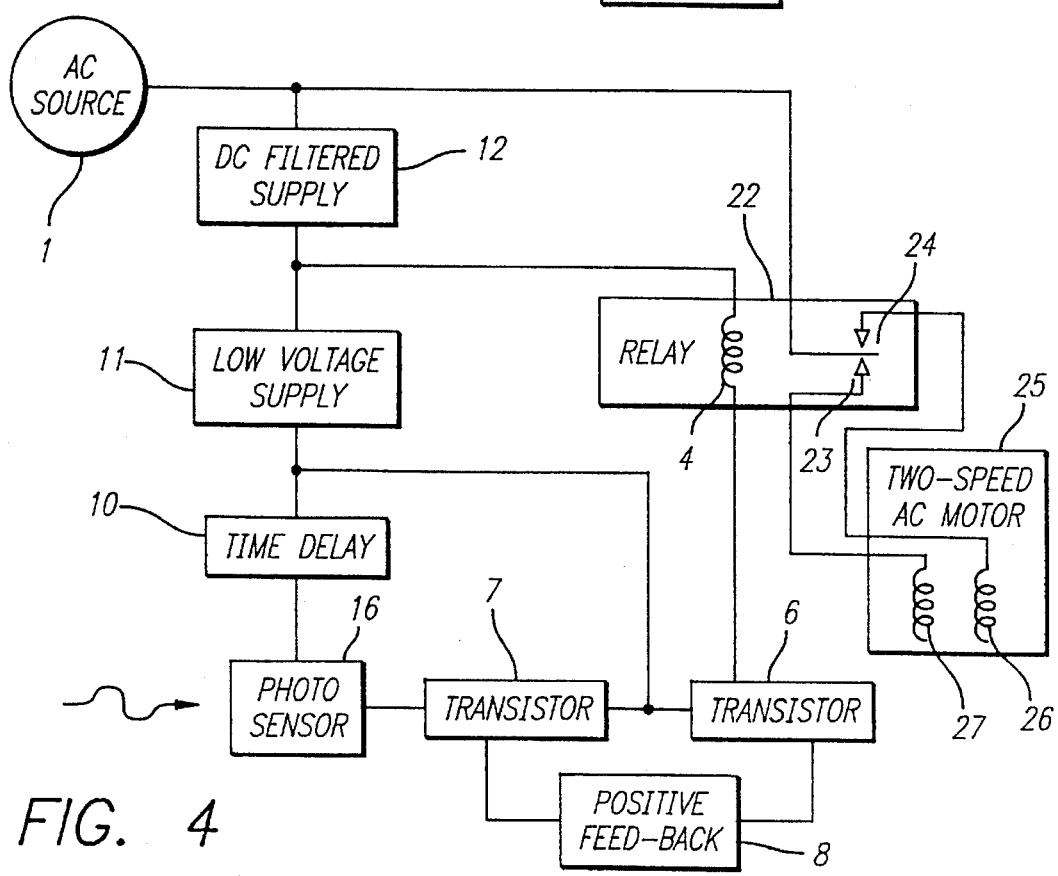
FIG. 4 is a block diagram illustration of another embodiment of the invention, showing a two-speed motor with a day/night controller constructed in accordance with the invention.

FIG. 4 is a block diagram illustration of another embodiment of the invention, showing a two-speed motor with a day/night controller constructed in accordance with the invention. FIG. 4 is similar to FIG. 3, except for the presence of a high speed field coil 26 and a low speed field coil 27 in the motor 25, and the addition of a normally closed relay contact 23. In the illustrated embodiment, the energized relay coil causes a closure of relay contact 24 to bring the high speed field coil 26 into circuit during the day, so that the motor runs at high speed. Conversely, de-energization of the relay coil brings the low speed coil 27 of the motor 25 into circuit instead, causing the motor 25 to run at low speed. Naturally, the same relay can be used in the FIG. 3 embodiment, with the normally closed contact simply left uncoupled to anything external to the relay.

Figure 5:
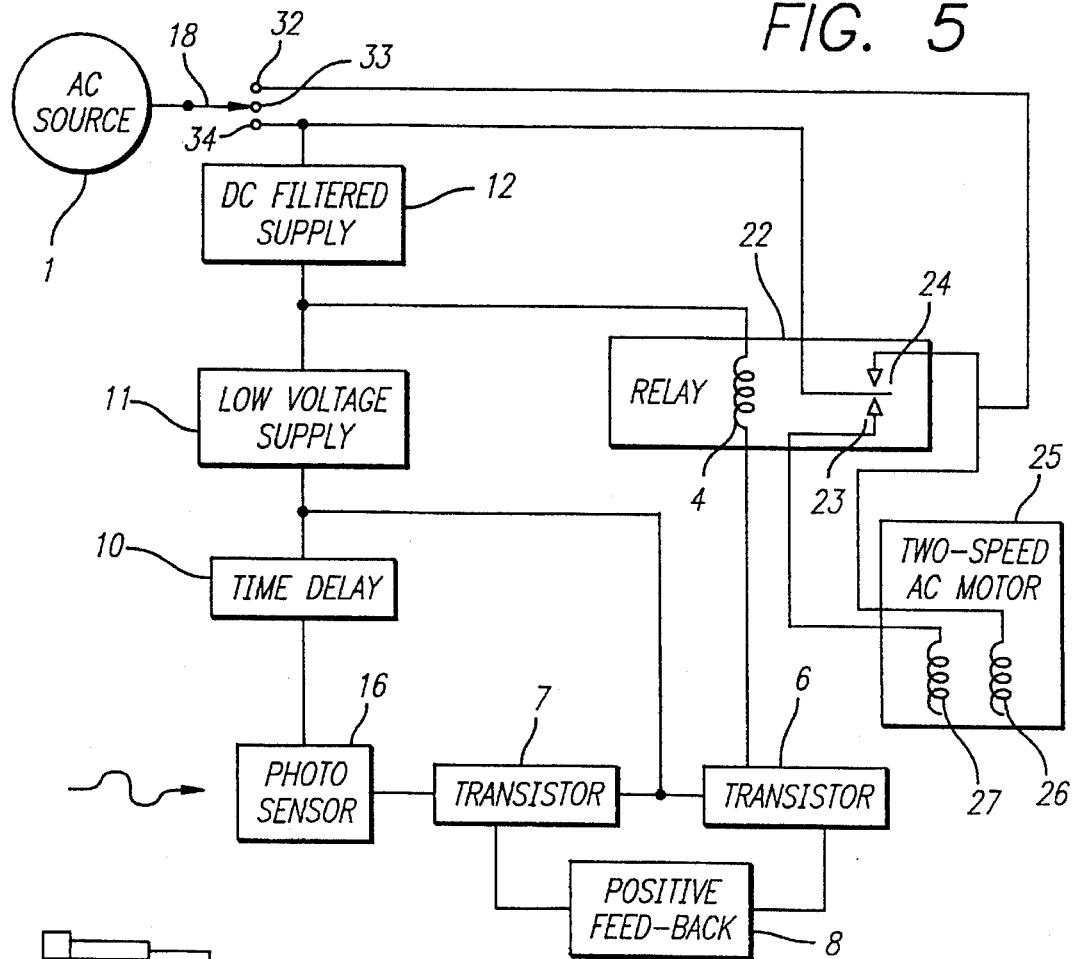
FIG. 5 is a block diagram illustration of another embodiment of the invention, showing a two-speed motor with a manually actuable day/night controller constructed in accordance with the invention.

The effect on the motor of light and dark can be reversed as previously described with respect to FIG. 3 to provide high speed operation at night, and low speed operation during the day, if desirable. Moreover, as illustrated in FIG. 5, the embodiments of both FIGS. 3 and 4 can be further modified by placing a switch 18 in circuit between the AC source 1 and the motor and control circuit to permit a user to manually decouple the AC source from the motor and day/night control circuitry, thereby providing a fully OFF capability for the motor for use during maintenance or periods of extended inactivity. Further, additional switch positions can be provided to directly couple the AC source to a selected one of the motor's field coils to bypass the control circuitry and provide a fully ON function at the selected speed. In FIG. 5, the switch contact 32 is electrically coupled to the high speed field coil 26, providing a switch position that permits the motor to run continuously at high speed regardless of the lighting condition.

Because the motor control circuitry, including the photosensor, is mounted within the motor and derives its power from the AC power terminals within the motor housing, no external control panels, mountings, or wiring are necessary for installation. Moreover, the photosensor and remaining control circuitry occupy minimal space within the motor housing, and are conveniently mounted on a circuit board 30 (FIG. 2) within the housing's end cap 14. Thus, a self-contained control circuit fit within an end cap can be provided as a retrofit for existing motors, enabling users to benefit from the resulting reduction in electrical consumption, particularly as seasonal fluctuations in daylight hours are automatically compensated for.

The control circuitry can be affixed to the motor housing in other ways without departing from the spirit of the invention. For example, the circuitry can be mounted within its own enclosure, with that enclosure being affixed to the exterior of the motor housing. The control circuitry still derives its power from the motor's AC power terminals, so that no external control panel, mountings, or wiring to the panel are necessary for installation.

Figure 6:
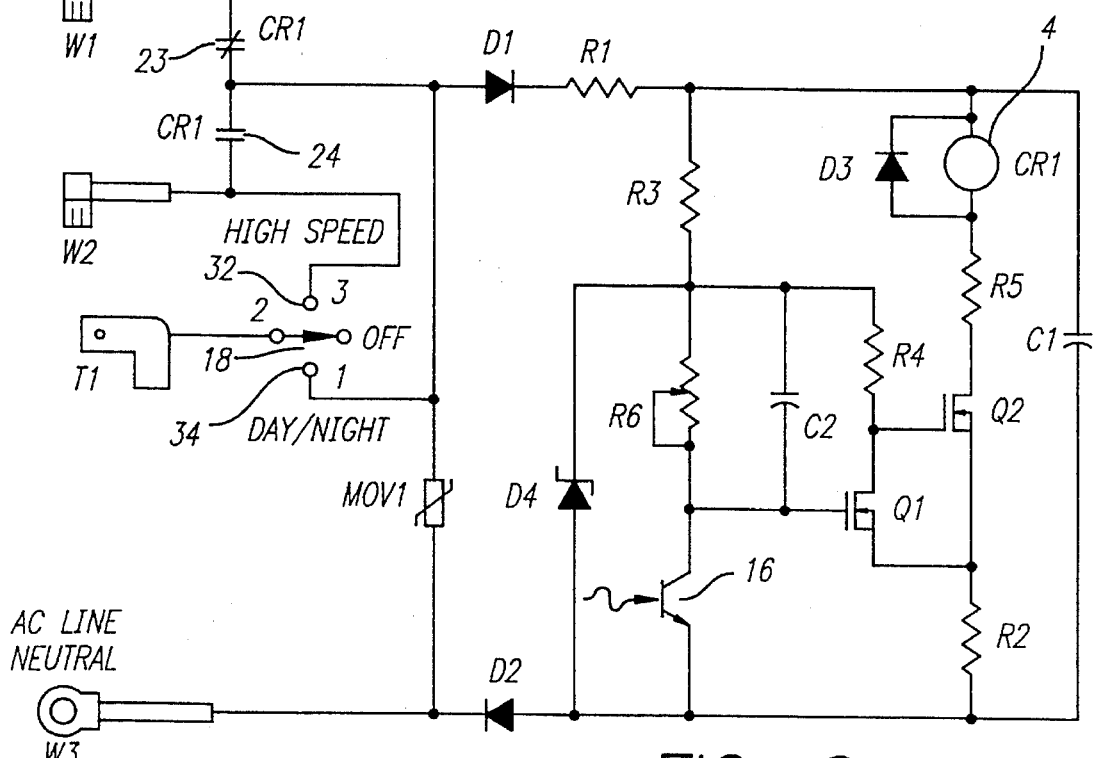
FIG. 6 is an electrical schematic of a day/night control circuit constructed in accordance with the invention.

FIG. 6 is an electrical schematic of a day/night control circuit for use with a two-speed AC motor and constructed in accordance with the invention. As shown in the schematic, the AC power source is coupled to the motor and control circuitry via a switch 18 which enables a user to select continuous high speed operation or day/night control. The "high speed" contact of the switch is serially coupled to one side of the motor's high speed winding W2 for that purpose. The other side of the high speed winding (not shown) is coupled to the neutral AC line.

The "day/night" contact of the switch 18 is coupled to the junction of the normally-open and normally-closed contacts of the relay. The high-speed winding of the motor is serially coupled to the AC power line through the normally-open relay contacts 24, while the low-speed winding of the motor is coupled to the AC power line through the normally closed relay contacts 23. The relay contacts 23, 24 are operatively coupled to the relay coil 4, which is in turn electrically coupled between the "day/night" contact 34 of the switch 18 and the neutral AC line. When the switch 18 is at the "day/night" position, AC power is accordingly applied to its "day/night" contact, powering the control circuitry as hereinafter described.

A phototransistor 16 responds to the sensing of light to couple one end of a delay-adjusting potentiometer R6 to the AC neutral line. The other end of the potentiometer is coupled to the "day/night" contact 34 of the switch 18 through a resistor R3, a resistor R1, and a diode D1 which rectifies the AC line voltage. During daylight, the resulting drop in voltage at the collector of the phototransistor 16 and at the gate of transistor Q1 causes switching transistor Q1 to turn off. This, in turn, causes switching transistor Q2 to turn on, coupling the relay coil 4 to the AC neutral line. The relay coil 4 consequently closes the normally-open relay contact 24, coupling the high speed winding to the AC supply, and decouples the low-speed winding from the AC supply by opening the normally-closed contact 23.

As previously described, the control circuit herein includes a time delay circuit to not only minimize "nuisance switching" by delaying the photosensor's effect on the switching circuit until the sensed change in ambient light condition exceeds a predetermined time, but to also determine the level of light which will induce switching. The illustrated circuit in FIG. 6 includes a user-adjustable delay circuit in the form of the potentiometer R6 and a capacitor C1. The capacitor C1 is coupled between the "day/night" contact 34 the switch 18 and the neutral AC line in parallel with the potentiometer R6 and phototransistor 16. The capacitor C1 and the potentiometer R6 impose an RC constant on the switching circuit which delays the change in voltage at the collector of the phototransistor 16 when the phototransistor 16 turns on or off. Thus, the switching of the switching circuit is delayed, as is the energization of the relay coil, when the light level impinging on the phototransistor passes the switching point of the circuit. Adjustment of the potentiometer R6 changes the RC constant, thereby adjusting the amount of delay. Similarly, the adjustment in resistance of R6 changes the light level at which switching occurs.

The feedback resistor R2 provides an additional delay effect in response to light changes of night-to-day and day-to-night, and also ensures that the relay coil is provided with either substantially full voltage or substantially no voltage. As light intensity increases to the given set point, transistor Q1 stops conducting, and transistor Q2 immediately connects the relay coil to the resistor R2. This results in a substantial voltage drop through resistor R2 and thereby imposes a raise in the bias voltage of transistor Q1, preventing further conduction of transistor Q1. When the light intensity decreases, the voltage at the photosensor must increase substantially higher than that set point to overcome the bias voltage at resistor R2 before transistor Q1 turns on again, turning transistor Q2 off and disconnecting the relay coil. The resulting effect is the creation of a differential in the light intensities required to cause "turn off" and "turn on" of the relay. This, in turn, creates a delay in the switching from day to night operation.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

We claim:

1. An electric motor comprising:
   (A) an electric motor having AC power terminal means for coupling the motor to a source of electric power;
   (B) motor housing means having an interior surface and an exterior surface, the interior surface of the housing means generally encompassing the motor and the AC power terminal means;
   (C) switching circuit means affixed to a surface of the motor housing means and electrically coupled for power to the AC power terminal means within the motor housing means, the switching circuit means being responsive to a switching signal for selectively switching the motor between one of two speeds;
   (D) photosensor means affixed to the motor housing means and positioned to generate the switching signal to the switching circuit means in response to the amount of light incident on at least a portion of the housing means,
   whereby the motor is switched between daytime and nighttime speeds in response to ambient light.

2. The electric motor of claim 1 wherein the motor housing means includes an aperture communicating between its interior and exterior surfaces, and
   wherein the photosensing means includes photosensing transistor means positioned within the aperture to sense light exterior to the housing means.

3. The motor of claim 2 wherein the switching circuit means is within the interior of the motor housing means.

4. The electric motor of claim 1 wherein the switching circuit means includes delay means for inhibiting the switching between daytime and nighttime speeds until the sensed change in incident light has persisted for a pre-selected period of time.

5. The electric motor of claim 4 wherein the delay means includes adjustment means for varying the required time for persistence of the sensed lighting change.

6. The electric motor of claim 5 wherein the adjustment means is affixed to the motor housing, and positioned to be accessible without the use of tools.

7. A motor control assembly for converting to daylight-responsive operation an electric motor disposed within a housing having an end cap, the motor including AC power terminals within the housing, said assembly comprising:
   (A) retrofit end cap means having an interior surface and an exterior surface, the interior surface of the retrofit end cap means being adapted to generally encompass at least a portion of an electric motor disposed within the housing;
   (B) switching circuit means affixed to the retrofit end cap means and adapted to be electrically coupled for power to the AC power terminal means, the switching circuit means being responsive to a switching signal for selectively switching the motor between one of two speeds;
   (C) photosensor means affixed to the retrofit end cap means and positioned to generate the switching signal to the switching circuit means in response to the amount of light incident on the exterior surface of the retrofit end cap means.

8. The electric motor of claim 7 wherein the retrofit end cap means includes an aperture communicating between its interior and exterior surfaces, and
   wherein the photosensing means includes photosensing transistor means positioned within the aperture to sense light exterior to the retrofit end cap means.

9. The motor of claim 8 wherein the switching circuit means is within the interior of the retrofit end cap means.

10. The electric motor of claim 7 wherein the switching circuit means includes delay means for inhibiting the switching between daytime and nighttime speeds until the sensed change in incident light has persisted for a pre-selected period of time.

11. The electric motor of claim 10 wherein the delay means includes adjustment means for varying the required time for persistence of the sensed lighting change.

12. The electric motor of claim 11 wherein the adjustment means is affixed to the retrofit end cap means, and positioned to be accessible without the use of tools.

13. An AC motor adapted to be connected to a source of AC power, and comprising:
   (A) a motor housing encompassing the AC motor, the motor housing having an interior surface and an exterior surface and an aperture communicating between the interior and exterior surfaces;
   (B) DC power source means within the motor housing and coupled to the AC power source for power;
   (C) normally-open relay contact means within the motor housing responsive to a control signal to undergo a state change from open-circuit to closed-circuit condition;
   (D) a motor field winding within the motor housing coupled in electrical series with the normally-open relay contact means to the AC power source;
   (E) relay coil means within the motor housing and electrically coupled to the DC power source;
   (F) switching circuit means mounted to a surface of the motor housing and coupled for power to the DC power source means to selectively energize the relay coil means so as to cause a state change in the normally-open relay contact means, the switching circuit means including photosensing means mounted within the housing aperture to sense the light level at the exterior surface of the housing so that the relay coil is energized when the photosensing means senses a pre-selected light level.

14. The motor of claim 13 wherein the switching circuit is configured to energize the relay coil means when the photosensing means senses at least the pre-selected light level.

15. The motor of claim 13 wherein the switching circuit is configured to energize the relay coil means when the photosensing means senses no more than the pre-selected light level.

* * * * *